United States Patent [19]

Hayashi et al.

[11] 4,084,841
[45] Apr. 18, 1978

[54] AUTOMATIC SEAT BELT APPLYING DEVICE

[75] Inventors: Toshiaki Hayashi, Kasugai; Hiroshi Sugiura; Toshio Ozaki, both of Toyota; Eiji Sugimoto, Toyota; Yukio Banno, Toyohashi, all of Japan

[73] Assignee: Toyota Jidosha Kogyo Kabushiki Kaisha, Toyota, Japan

[21] Appl. No.: 224,079

[22] Filed: Feb. 7, 1972

[30] Foreign Application Priority Data

| Feb. 11, 1971 | Japan | 46/5842[U] |
| Apr. 1, 1971 | Japan | 46/23729[U] |
| Apr. 1, 1971 | Japan | 46/19887 |
| Apr. 1, 1971 | Japan | 46/19888 |
| Apr. 1, 1971 | Japan | 46/19889 |

[51] Int. Cl.² .............................................. B60R 21/10
[52] U.S. Cl. .................................................. 280/745
[58] Field of Search ........................... 280/745; 180/82

[56] References Cited

U.S. PATENT DOCUMENTS

3,411,602   11/1968   Royce ...................... 280/150 SB

*Primary Examiner*—Robert R. Song
*Attorney, Agent, or Firm*—Stevens, Davis, Miller & Mosher

[57] ABSTRACT

This invention relates to an automatic seat belt applying device. Said device comprises seat belt means adapted to confine an occupant of a seat to a back rest thereof, a spring-loaded retractor secured to a vehicle body reinforcing member, and a guide mounted at a front end of a member connected for operation in association with opening and closing of said door and loosely supporting an intermediate portion of said seat belt means so as to guide the same. Said seat belt means is connected at one end to said retractor to be wound thereon by the resilience of the spring and at at least another end to a supporter mounted at least for forward and rearward movement in an outer marginal portion of a door hingedly supported at its inner marginal portion by a vehicle body and disposed adjacent said seat.

7 Claims, 20 Drawing Figures

AUTOMATIC SEAT BELT APPLYING DEVICE

This invention relates to an automatic seat belt applying device whereby a seat belt mounted in each seat of a motor vehicle can be applied automatically to an occupant of the seat irrespective of whether or not the occupant intends to wear the seat belt.

Nowadays, motor vehicles are equipped with seat belts but it has hitherto been left to the discretion of each occupant whether the occupant applies to his body the seat belt mounted in his seat. The practice of applying the seat belt to the occupant's body is somewhat troublesome and has not therefore become as popular as it should be. Actually, very small proportions of all the occupants of motor vehicles have taken the trouble to apply the seat belts to their bodies, so that the seat belts provided in motor vehicles have been unable to perform the function of preventing the occupants of motor vehicles from suffering injury at the time of collision.

In view of the unwillingness of the occupants of motor vehicles to apply seat belts to their bodies, proposals have been made to provide air-bags in motor vehicles as alternative means for preventing the occupants from suffering injury at the time of collision or other accident. Some problems, such as prevention of misoperation or reduction of cost, have to be obviated before this means of safeguarding the bodies of occupants of motor vehicles against injury can be put to practical use. It is expected that it takes a considerably long period of time to obviate these problems.

An ojbect of this invention is to provide an automatic seat belt applying device whereby seat belt means connected at one end to a retractor and at least another end to a door or at one end of a pivotal member in a vehicle body can be automatically applied to the body of an occupant of the seat to which such belt means is mounted, in association with opening and closing of the door.

Other objects as well as features and advantages of this invention will become evident from the description set forth hereinafter when considered in conjunction with the accompanying drawings, in which.

It is to be noted that the automatic seat belt applying device according to this invention can be mounted in any seat of a motor vehicle. For simplicity's sake, the invention will be described herein with reference to some embodiments of the invention which are incorporated in the seat of the driver of the motor vehicle and embodiments incorporated in a rear seat. It should be understood, however, that this description is for illustrative purpose only and that the invention is not limited to the particular seat of the motor vehicle in which the device is described as being mounted. A first embodiment shown in FIG. 1 to FIG. 6 will now be described. In the drawings, 1 designates seat belt means comprising three elements connected to one another and adapted to confine an occupant P to a back rest of a seat 18. Seat belt means 1 is connected at one end to a retractor 17, at another end to a supporter 22 disposed in an outer lower marginal portion of a door 3 which is hingedly supported at its inner marginal portion by a vehicle body for opening and closing, and at still another end to a supporter 21 which is a free end bar disposed in an outer higher marginal portion of door 3. It will be seen that in this invention the end of the seat belt means which is connected to a floor, seat or other vehicle body reinforcing member on door 3 side of seat 18 in conventional seat belt means is connected to the lower outer portion of door 3 and the end of the shoulder strap which is secured to the center pillar or ceiling in conventional seat belt means is connected to the higher outer portion of door 3.

It is to be understood that this invention can be incorporated not only in seat belt means of the three end type but also in seat belt means of the two end type in which the shoulder strap is eliminated.

Retractor 17 which may be firmly secured to or embedded in a floor 2 of the vehicle body is spring-loaded so that the seat belt means 1 can be normally wound thereon by the resilience of the spring. A seat belt means guide arm 7 pivotally connected to a portion of floor 2 disposed on the retractor 17 side of seat 18 extends forwardly and mounts at its front end a seat belt means guide 8. A rod 6 is connected at one end to a substantially intermediate portion of arm 7 and at the other end to an output shaft of a motor 5 for movement. It is to be understood that motor 5 may be replaced by means which moves rod 6 by vacuum, compressed air or an electromagnetic force.

Figure 5:
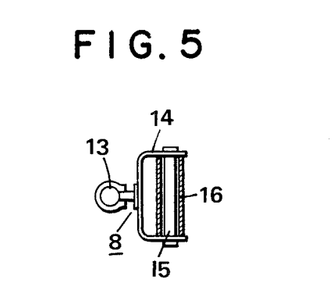
FIG. 5 is a fragmentary sectional view of the seat belt means guide.

Seat belt means guide 8 is rotatably mounted at the free end of arm 7 through a joint 13 and comprises a bracket 14 and a shaft 15 as shown in FIG. 5. Seat belt means 1 is passed between bracket 14 and shaft 15. A collar 16 is preferably loosely mounted on shaft 15 so as to reduce frictional dragging of seat belt means 1 on bracket 14 and shaft 15 when it slidably passes therebetween.

Figure 4:
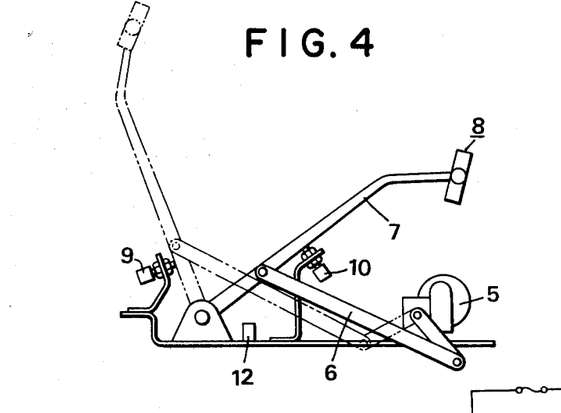
FIG. 4 is a side view of the seat belt means guide arm and means for operating the same.

In FIG. 4, 9 is a limit switch which limits the movement of arm 7 in a direction in which it moves away from the back rest of seat 18. Limit switch 9 is open when arm 7 is in contact therewith and closed when it is out of contact therewith. 10 is a limit switch which limits the movement of arm 7 in a direction in which it moves toward the back rest of seat 18. Limit switch 10 is open when arm 7 is in contact therewith and closed when it is out of contact therewith.

Figure 6:
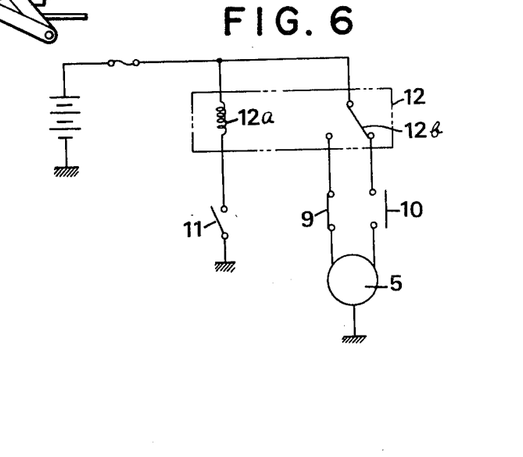
FIG. 6 shows a control circuit for operating the device according to this invention.

Two operation circuits are provided for different directions of rotation of motor 5 to actuate arm 7 through rod 6, and limit switches 9 and 10 are inserted in these two operation circuits respectively as shown in FIG. 6. Two operation circuits are connected to a power source through a contact 12b of a relay 12 which has a coil 12a connected to power source through a door switch 11 adapted to be closed when door 3 is open. Door switch 11 may be replaced by a manual switch or a switch which is adapted to be closed when door lock means is unlocked. Arm 7 may be fulcrumed at an instrument panel or the ceiling instead of floor 2.

Operation of the first embodiment constructed as aforementioned will now be described. If door 3 is opened, the two ends of seat belt means 1 connected to door 3 will move with the door. Opening of door 3 closes door switch 11 and excites coil 12a and brings contact 12b into engagement with the operation circuit in which limit switch 9 is inserted so as to operate motor 5 through this operation circuit.

This causes arm 7 to be moved through rod 6 in a direction in which it moves away from the back rest of seat 18, so that seat belt means 1 is paid out from retractor 17 and moves through seat belt means guide 8. If arm 7 reaches a double dot-and-dash line position in FIG. 4 where it is brought into contact with limit switch 9 and opens the same, thereby interrupting the rotation of motor 5. At this time, seat belt means 1 is in a position shown in FIG. 2 and FIG. 3 and permits occupant P to be readily seated on seat 18.

If occupant P is seated on seat 18 and door 3 is closed, the two ends of seat belt means 1 connected to door 3 will move with the door. Closing of door 3 opens door switch 11 and renders the coil 12a of relay 12 inoperative and brings the contact 12b thereof into engagement with the operation circuit in which limit switch 10 is inserted so as to operate motor 5 through this operation circuit.

Figure 1:
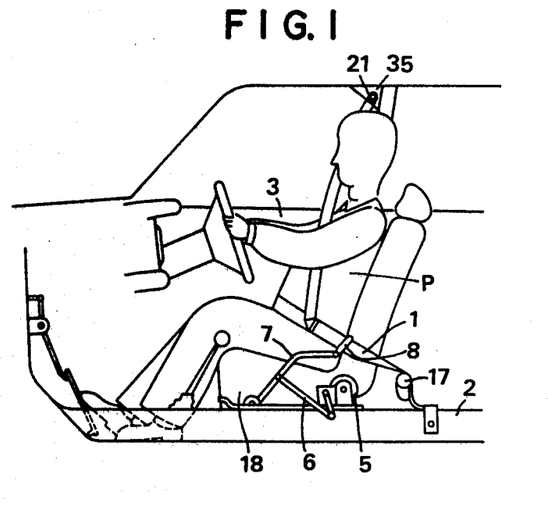
FIG. 1 is a side view of a first embodiment of this invention showing an occupant of a motor vehicle having seat belt means applied to his body.
Figure 2:
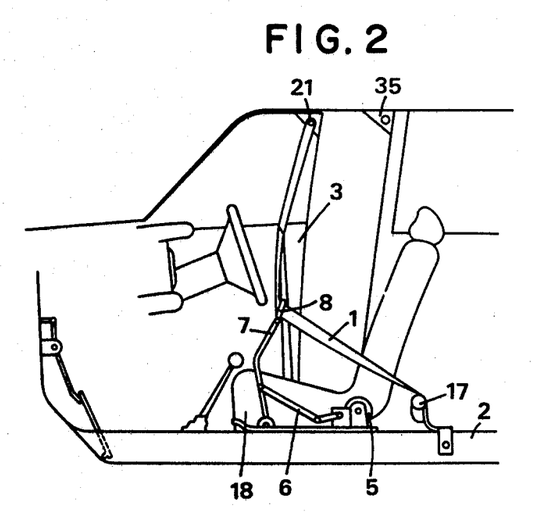
FIG. 2 is a side view of the first embodiment of this invention with the seat belt means being shown in a position which it assumes when the door is opened.
Figure 3:
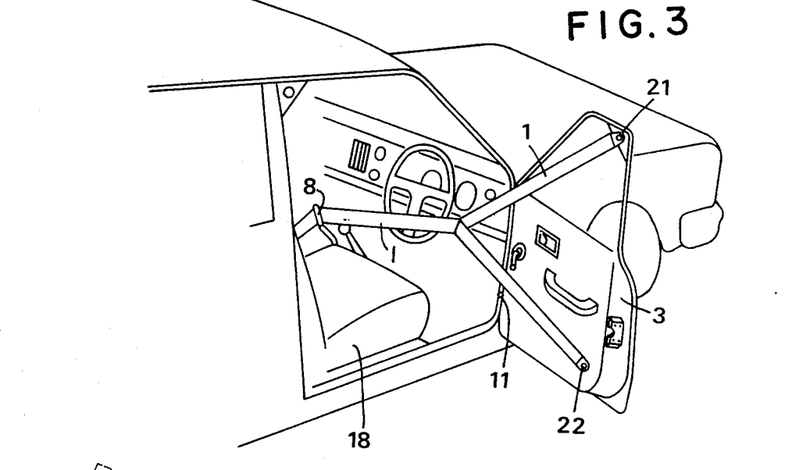
FIG. 3 is a perspective view of the first embodiment showing the seat belt means on a side of the vehicle opposite to the side on which the seat belt means is shown in FIG. 2.

This causes arm 7 to be moved through rod 6 in a direction in which it moves toward the back rest of seat 18, so that seat belt means 1 moves through guide 8 to be retracted by retractor 17 and wound thereon. Thus, seat belt means 1 is fastened and confines occupant P to seat 18. If arm 7 reaches a solid line position in FIG. 4, then it is brought into contact with limit switch 10 and opens the same, thereby interrupting rotation of motor 5. As the result, seat belt means 1 is applied to occupant of seat as shown in FIG. 1, so that occupant P is confined to seat 18 by seat belt means and prevented from being caused by the impact of collision to strike any object inside the vehicle body at the time of collision.

If occupant P of seat 18 opens door 3 when he wants to get off the vehicle, seat belt means 1 will be paid out from retractor 17 and at the same time arm 7 will move away from the back rest of seat 18 as door switch 11 is closed, thereby automatically releasing occupant P from engagement with seat belt means 1 and permitting him to get off the vehicle. If door 3 is closed again, then seat belt means 1 is retracted by rectractor 17 again.

From the foregoing description, it will be appreciated that this embodiment of the automatic seat belt applying device according to this invention can be incorporated in a seat of a motor vehicle which is disposed adjacent a door and permits seat belt means to be automatically applied to the body of an occupant of seat in association with opening and closing of the door. The device according to this invention offers an advantage in that it eliminates the trouble of manually applying and fastening the seat belt means. Since the device is effective to make all the occupants of seats of a motor vehicle wear seat belt willy-nilly, it provides positive means for safeguarding the occupants of the motor vehicle against possible danger to which they might be exposed at the time of collision.

Figure 7:
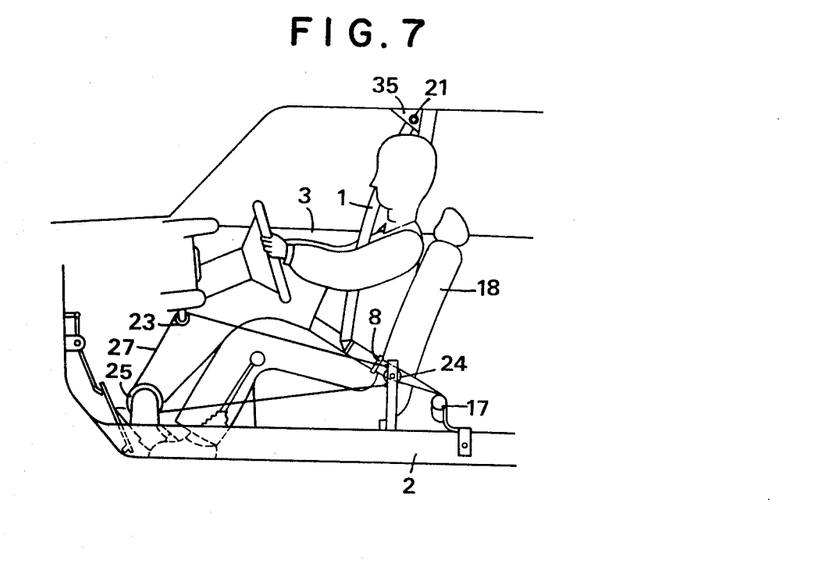
FIG. 7 is a side view of a second embodiment of this invention showing an occupant of a motor vehicle having seat belt means applied to his body.

In a second embodiment of this invention, seat belt means guide mounted on a flexible wire is moved as door is opened and closed, so that seat belt means can be automatically applied to or removed from the body of occupant of seat. The second embodiment will be described with reference to FIG. 7 and FIG. 8 in which like reference characters designate parts similar or equivalent to the parts of the first embodiment shown in FIG. 1 to FIG. 6.

Figure 8:
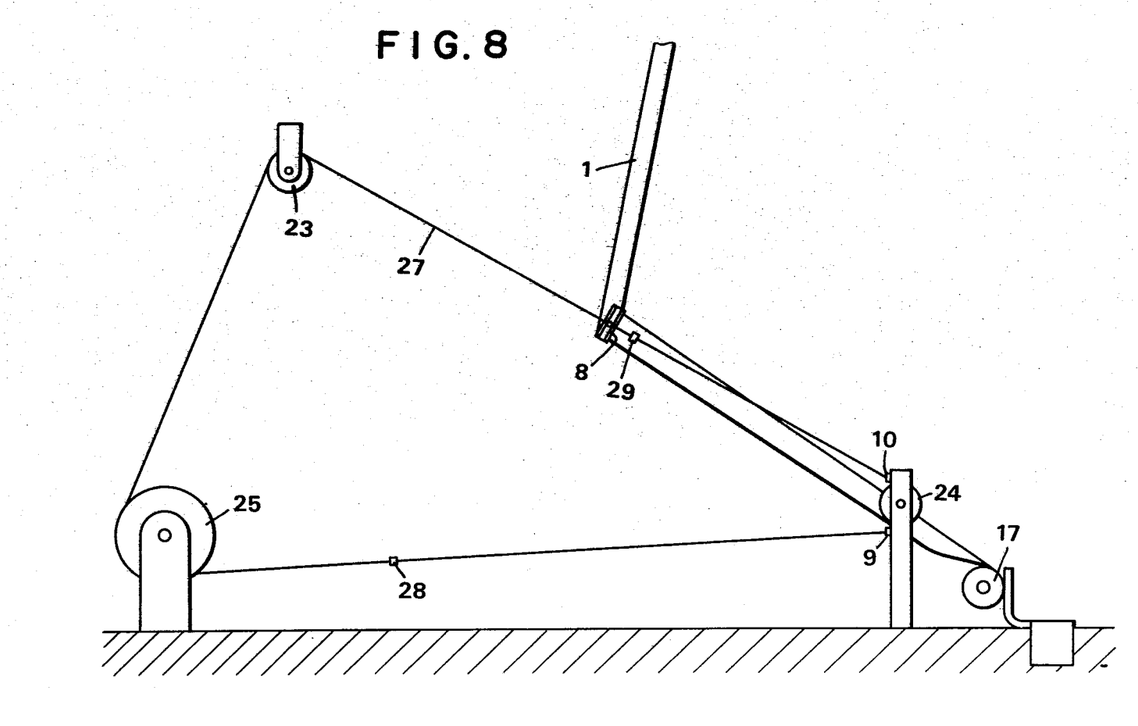
FIG. 8 is a side view of the seat belt means guide means and means for operating the same.

Supporter 21 at which one end of seat belt means 1 is supported may be mounted not in the swing door but on a sliding door or other special operation member. Seat belt means 1 is connected through seat belt means guide 8 to one end of a flexible wire 27, such for example as a metallic wire, metallic rope or the like, which is connected at the other end to a motor 25 or other drive means. Flexible wire 27 is endlessly mounted through pulleys 23 and 24. In FIG. 8, 9 is a limit switch which limits the movement of seat belt means guide 8 in a direction in which it moves away from the back rest of seat 18. Limit switch 9 is opened when it is brought into contact with a stopper 28 and closed at other times. 10 is a limit switch which limits the movement of seat belt means guide 8 in a direction in which it moves toward the back rest of seat 18. Limit switch 10 is opened when it is brought into contact with a stopper 29 and closed at other times.

Two operation circuits are provided for different directions of rotation of operatin motor 25 for actuating the device according to this invention, limit switches 9 and 10 being inserted in these two operation circuits respectively. The two operation circuits are constructed and operate in the same manner as the corresponding operation circuits shown in FIG. 6, and their description is omitted.

Operation of the second embodiment will now be described. If door 3 is opened, at least one end of seat belt means 1 connected to supporter 21 will move forwardly with door 3 and cause door switch 11 to be closed. This excites coil 12a of relay 12 and brings contact 12b into engagement with the operation circuit in which limit switch 9 is inserted so as to operate motor 25 through this operation circuit.

Operation of motor 25 through the circuit in which limit switch 9 is inserted feeds flexible wire 27 in a direction in which seat belt means guide 8 is moved away from the back rest of seat 18 by flexible wire 27. Thus, seat belt means 1 is paid out from retractor 17 by seat belt means guide 8 moved by flexible wire 27 till stopper 28 is brought into contact with limit switch 9 when the latter is opened to interrupt rotation of motor 25. At this time, seat belt means 1 is in a position shown in FIG. 2 and FIG. 3 and permits occupant to be readily seated on seat 18.

If occupant is seated on seat 18 and door 3 is closed, two ends of seat belt means 1 connected to supporters 21 and 22 will move rearwardly with door 3 and cause door switch 11 to be opened. This renders the coil 12a of relay 12 inoperative and brings the contact 12b thereof into engagement with the operation circuit in which limit switch 10 is inserted so as to operate motor 25 through this operation circuit.

Operation of motor 25 through the circuit in which limit switch 10 is inserted feeds flexible wire 27 in a direction in which seat belt means guide 8 is moved toward the back rest of seat 18 by flexible wire 27. Thus, seat belt means 1 is retracted toward retractor 17 by seat belt means guide 8 moved by flexible wire 27, so that seat belt means 1 is applied to the body of occupant of seat 18 as it is retracted by seat belt means guide 8.

If stopper 29 is brought into contact with limit switch 10 in FIG. 8, the latter is opened and interrupts operation of motor 25. At this time, seat belt means 1 is in a position shown in FIG. 7 so that it is effective to confine occupant to seat 18 at the time of collision to thereby prevent occupant from being caused by the impact of collision to strike any object inside the vehicle body.

If occupant of seat 18 opens door 3 when he wants to get off the motor vehicle, seat belt means 1 will be moved away from occupant as door 3 is opened and at the same time flexible wire 27 will be fed in a direction in which seat belt means guide 8 moves away from the back rest of seat 18 as door switch 11 is closed, thereby automatically releasing seat belt means 1 from engagement with occupant and permitting occupant to get off the vehicle. If door 3 is closed after occupant has got off the vehicle, then seat belt means 1 is retracted toward retractor 17 again as described previously.

Figure 9:
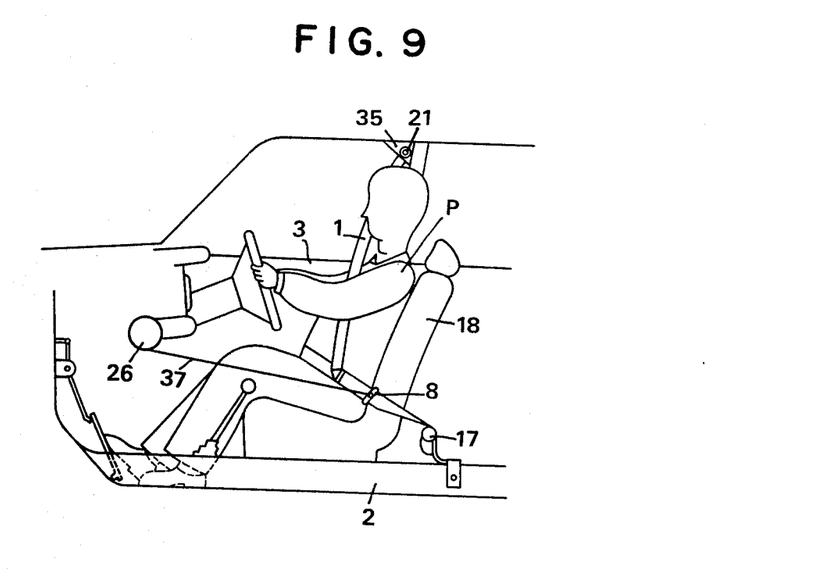
FIG. 9 is a side view of a third embodiment of this invention showing an occupant of a motor vehicle having seat belt means applied to his body.

FIG. 9 shows a third embodiment of this invention in which a flexible wire 37 having seat belt means guide 8 mounted at one end thereof is wound by a motor 26. If door 3 is opened, two ends of seat belt means 1 connected to door 3 will move with door 3 and cause door switch 11 to be closed. This starts motor 26 and causes flexible wire 37 to be wound by motor 26. When flexible belt 37 has been wound to such a degree that seat belt means 1 does not interfere with occupant getting on or off the vehicle, limit switch 9 mounted in motor 26 is opened and winding of flexible wire 37 is interrupted. If door 3 is closed, motor 26 will rotate such that flexible wire 37 is paid out from motor 26 till seat belt means guide 8 reaches a position shown in FIG. 9 when limit switch 10 mounted in motor 26 is opened and operation of motor 26 is interrupted.

The flexible wire 37 and motor for operating seat belt means guide 8 may be housed in a console box or other similar case. This is conducive to increased safety and better appearance of the interior of the motor vehicle from the point of view of design, since the arrangement simplifies the form of the vehicle body and eliminates projecting parts.

From the foregoing description, it will be appreciated that the automatic seat belt applying device comprising second or third embodiment of this invention permits seat belt means to be automatically applied to the body of an occupant of the seat disposed adjacent a door in association with opening and closing of the door. Since the device is effective to make all occupants of seats of a motor vehicle wear seat belts willy-nilly, it provides positive means for safeguarding occupants of the motor vehicle against possible danger to which they might be exposed at the time of collision.

If a rearwardly directed force of impact is exerted on a motor vehicle driven by a driver having a seat belt applied to his body by the device according to this invention as shown in FIG. 1 as is the case when the vehicle is involved in a head-on collision, the driver will be subjected to a force which tends to throw him forwardly. Seat belt means 1 will confine the driver to his seat by opposing this force, thereby safeguarding him against injury which he might otherwise suffer from being thrown against the instrument board, steering wheel or windshield. At this time, a considerably great force will be exerted on the supports at which ends of seat belt means 1 are connected, although such force may vary in magnitude depending on the magnitude of the force of impact which is initially exerted on the motor vehicle.

If the force exerted on each support of seat belt means were too great, the supports disposed on door 3 would not be able to bear the pressure and door 3 might undergo deformation, and driver might be thrown off his seat and suffer injury as seat belt means 1 is loosened.

Accordingly, means is provided in this invention to reinforce supports for end portions of seat belt means disposed in the door. More specifically, a reinforcement formed with an opening is provided in a vehicle body reinforcing member, and a seat belt means anchor support for holding an anchor plate to which end of seat belt means is connected is provided such seat belt means anchor support being adapted to be received in opening formed in reinforcement.

This reinforcing means will be described more in detail with reference to FIG. 10 and FIG. 11 in which 31 is a window frame of the opening and closing door 3 and 32 is a windowpane. Secured to door 3 is a seat belt means anchor support 21 which projects into the interior of the vehicle body. An anchor plate 36 to which seat belt means 1 is connected at its end is loosely fitted over anchor supporter 21 for free movement therealong, and a stopper 33 is secured to a front end of support 21 for precluding dislodging of anchor plate 36 from support 21.

20 is a reinforcing member on the vehicle body side, such for example as the ceiling, center pillar or floor, which is provided with a reinforcement 35 formed with an opening 34 corresponding in size and position to seat belt means anchor support 21. Reinforcement 35 may be provided in any portion of reinforcing member 20 on the vehicle body side. Reinforcement 35 is shown in FIG. 10 and FIG. 11 as being intended for the supporter of a shoulder strap of seat belt means of the three end type. It is to be understood that the invention is not limited to the provision of reinforcement 35 in this position and that it may be provided in a lower position or a higher position. It may be provided for a waist strap of the seat belt means.

If door 3 is opened, seat belt means anchor support 21 and anchor plate 36 will move with door 3 and keep seat belt means 1 from interfering with a person getting in or off the motor vehicle. If door 3 is closed, seat belt means anchor support 21 will be received in opening 34 formed in reinforcement 35 as shown in FIG. 10 and FIG. 11 so that seat belt means 1 confine occupant to his seat.

Figure 10:
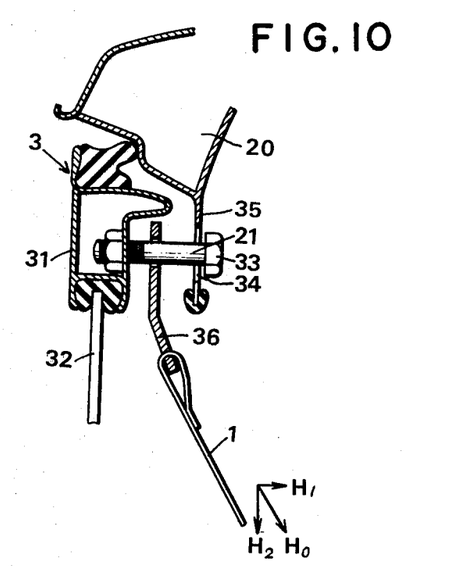
FIG. 10 is a vertical sectional view of anchor seat belt means according to this invention.
Figure 11:
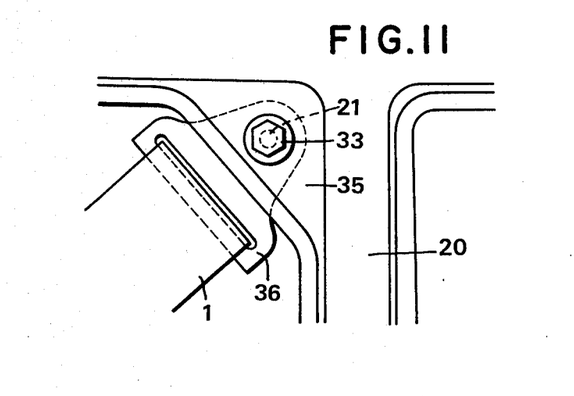
FIG. 11 is a side view of the anchor means of the seat belt means according to this invention as seen from inside the vehicle when the door is closed.

If a great force $H_0$ is exerted on seat belt means 1 in a direction shown in FIG. 10, anchor plate 36 will move along seat belt means anchor support 21 till it is brought into contact with reinforcement 35 when a horizontal component $H_1$ of the force $H_0$ is all borne by reinforcement 35. A vertical component $H_2$ of force $H_0$ is borne by support 21, but if support 21 is deformed and brought into contact with an inner peripheral surface of opening 34 the force $H_2$ will also be borne by reinforcement 35. Thus, seat belt means 1 will be positively supported by reinforcement even if door 3 deformed by the impact of a great force, in spite of the fact that free ends of seat belt means 1 are supported by door 3 of relatively low strength.

It will be appreciated that the automatic seat belt applying device according to this invention comprising reinforcing means as aforementioned permits seat belt means to be automatically applied to the body of an occupant of the seat disposed adjacent a door in association with opening and closing of the door. Seat belt means does not fail to perform its function even if the impact of a large force is exerted on the door at the time of collision, because the force is all borne by the reinforcements provided in a strength member on the vehicle body side and occupant is safely confined by seat belt means to his seat.

Figure 12:
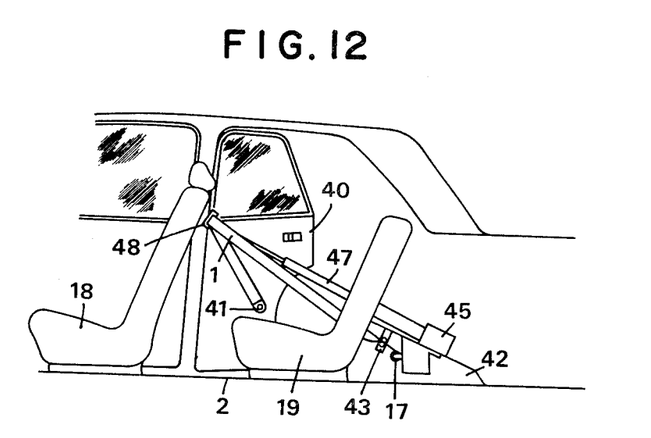
FIG. 12 is a side view of a fourth embodiment of this invention.

A fourth embodiment of this invention will now be described with reference to FIG. 12 to FIG. 14. 1 designates a seat belt means of the two end type for confining the occupant to a seat 19 which is connected at one end to a retractor 17 and at the other end to a seat belt means supporter 41. This embodiment is shown and described as being mounted in a rear seat adjacent a door. Seat belt means supporter 41 is shown in FIG. 12 as being disposed at a position in an outer marginal portion of a door 40 opposite to an inner marginal portion at which door 40 is hingedly connected to the vehicle body. It is to be understood that this invention is not limited to this particular position of seat belt means supporter 41 and that supporter 41 may be a pulley movable along a rail disposed at a front end of an arm fulcrumed at one end for pivotal motion. Seat belt means 1 is not limited to one of two end type and may be of the three end type.

Figure 13:
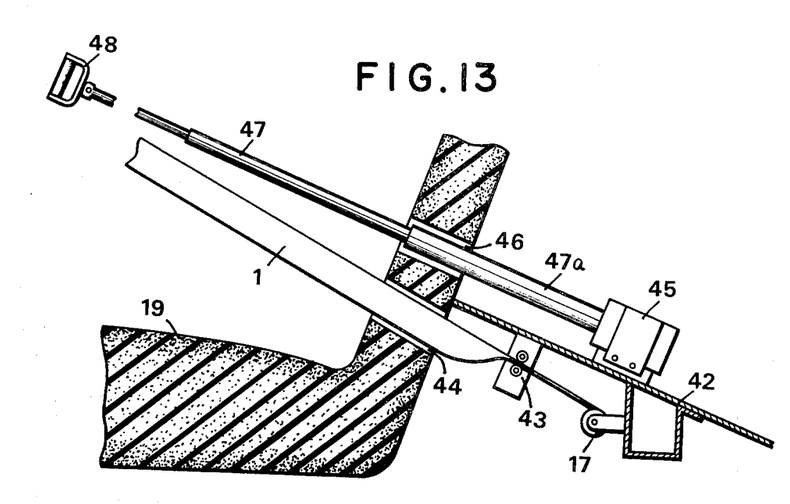
FIG. 13 is a fragmentary sectional side view of the essential portions of FIG. 12.
Figure 14:
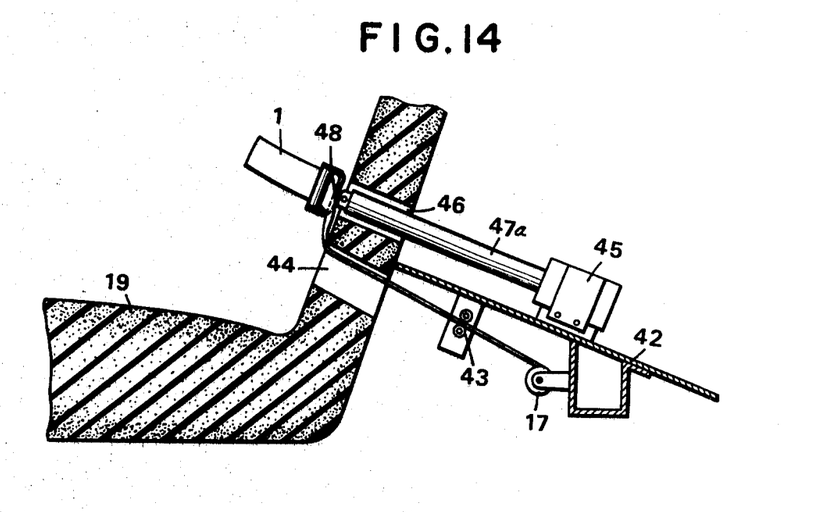
FIG. 14 is a fragmentary sectional side view similar to FIG. 13 but showing the essential portions while in operation.

As shown in FIG. 13, seat belt means 1 extends through an opening 44 formed in seat 19 and is passed between rollers 43 secured to a reinforcing member 42 on the vehicle body side and disposed parallel to retractor 17 to prevent overlapping of the belt before being wound on retractor 17 by its resilience. 47 is a telescopic arm extending through another opening 46 formed in seat 19 and connected to power means 45 secured to reinforcing member 42 for extension and contraction in telescopic motion as power means 45 is actuated.

Secured to a front end of telescopic arm 47 is a seat belt means guide 48 formed with a slit through which seat belt means 1 loosely extends. A first section 47a of telescopic arm 47 which is disposed nearer to power means 45 than a second section telescopically receives therein the second section when power means 45 is actuated. A motor is used as power means 45 in this embodiment, but it may be replaced by vacuum means, pneumatic means, electromagnetic means or hydraulic means. This embodiment is shown and described as being mounted in the rear seat, but it may be mounted in the front seat too. Telescopic arm 47 may be made to extend not from the rear of occupant but from the front of occupant too.

Operation of this embodiment will now be described.
If door 40 is opened by unlocking door lock means, seat belt means 1 will move with door 40. At the same time, door switch 11 shown in FIG. 6 is closed and the coil 12a of relay 12 is excited, so that the contact 12b of relay 12 is brought into engagement with the operation circuit in which limit switch 9 is inserted for operating motor 45 through this operation circuit.

Operation of motor 45 results in arm 47 telescopically extending and causing seat belt means 1 to be paid out of retractor 17. Limit switch 9 is opened when telescopic arm 47 has extended to its maximum length, thereby interrupting operation of motor 45 and telescopically extending movement of arm 47. At this time, seat belt means 1 is in a position shown in FIG. 12 and does not interfere with the action of occupant to get in and off the vehicle.

If occupant is seated on seat 19 and door is closed, seat belt means supporter 41 will move with door 40. At the same time, door switch 11 is opened so that the coil 12a of relay 12 is rendered inoperative and the contact 12b of relay 12 is brought into engagement with the operation circuit in which limit switch 10 is inserted. Motor 45 is thus operated through this operation circuit.

Operation of motor 45 results in arm 47 telescopically contracting and causing seat belt means 1 to be wound on retractor 17 through rollers 43. Limit switch 10 is opened when the section of telescopic arm 47 remote from motor 45 is received in the section 47a of arm 47, thereby interrupting operation of motor 45 and telescopically contracting movement of telescopic arm 47. At this time, seat belt means 1 is applied to the body of occupant of seat 19. The manner of applying of seat belt means 1 is shown in FIG. 14. Seat belt means 1 applied to occupant as shown is effective to restrain occupant from being thrown off seat 19 when the vehicle is involved in a collision, thereby preventing the force of impact of collision from exposing occupant to the danger of collision with an object in the vehicle body.

If occupant opens door 40 when he is going to get off the vehicle, seat belt means supporter 41 will move with door 40. At the same time, door switch 11 is opened and causes arm 47 to be telescopically extended, thereby automatically releasing seat belt means 1 from engagement with occupant and permitting him to get off the vehicle. Closing of door 40 again results in seat belt means 1 being wound on retractor 17 as described previously.

From the foregoing description, it will be appreciated that the automatic seat belt applying device according to this invention can be incorporated in a seat of a motor vehicle which is disposed adjacent a door and permits seat belt means to be automatically applied to the body of an occupant of the seat in association with opening and closing of the door. The device according to this invention offers an advantage in that it eliminates the trouble of manually applying and fastening the seat belt means. Since the device is effective to make all occupants of seats of a motor vehicle wear seat belts willy-nilly, it provides positive means for safeguarding the occupants of the motor vehicle against possible danger to which they might be exposed at the time of collision. The telescopic arm can be constructed such that it does not extend into the interior of the vehicle body so that it may do no harm to occupants and the appearance of the seats may not be spoiled.

A fifth embodiment of the invention shown in FIG. 15 to FIG. 19 will now be described. 1 is seat belt means of two end type connected at one end to a retractor 17 and at the other end to a front end of an operation arm 52 through an anchor plate 51. Seat belt means 1 moving through an opening 46 formed in a back rest, a seat of an intermediate portion of the back rest and a seat 19 is passed between rollers 43 to prevent the seat belt means from being folded before it is wound on retractor 17 energized by a spring built therein.

Figure 17A:
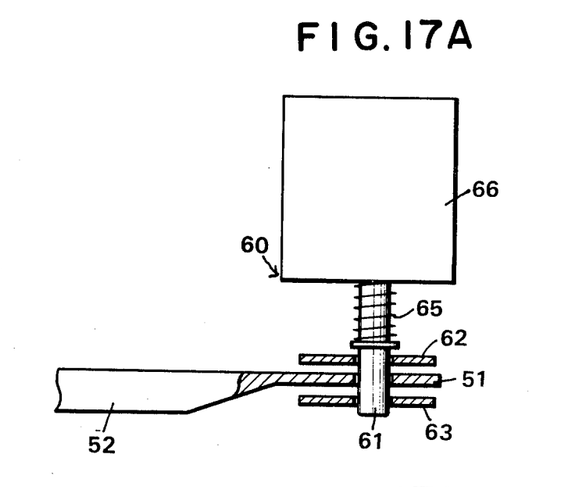
FIG. 17A and FIG. 17B are fragmentary sectional plan views of the essential portions of lock means of the fifth embodiment.

Operation arm 52 is adapted to be moved by power means 54 from a vertical position to a substantially horizontal position. Lock means 60 locks arm 52 as shown in FIG. 17A when arm 52 is brought to its horizontal position so that it is locked to a vehicle body reinforcing member 42. In the illustrated embodiment, a motor is used as the power means 54 and a pin 61 actuated by a solenoid is used as lock means 60. It is to be understood however that other power means, such for example as a vacuum means, pneumatic means, electromagnetic means or hydraulic means, may be used in place of the motor and that any other known lock means than the pin may be used.

Figure 15:
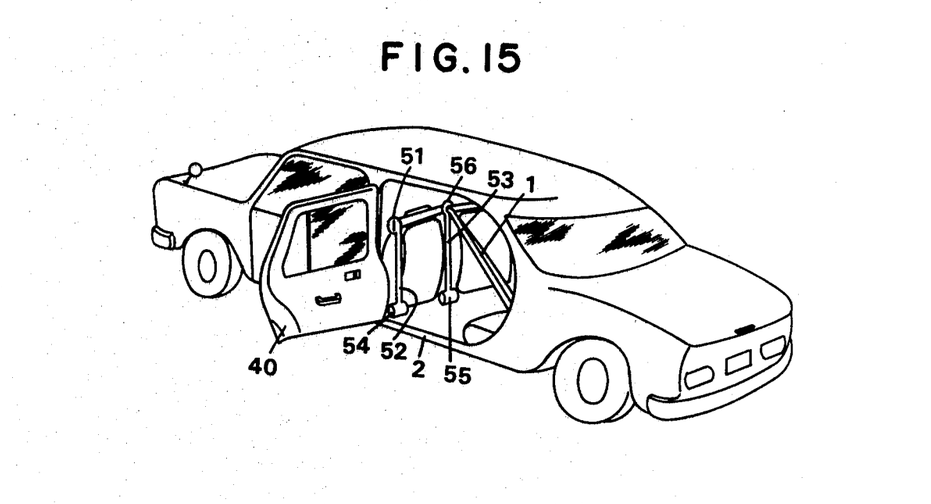
FIG. 15 is a perspective view of a fifth embodiment of this invention with seat belt means being shown in a position which it assumes when the door is opened.
Figure 16:
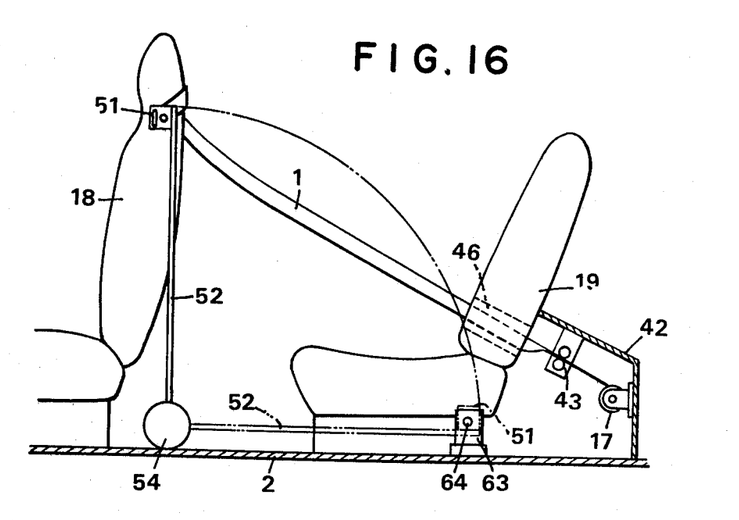
FIG. 16 is a side view of the essential portions of an operation arm of the fifth embodiment.

53 in FIG. 15 is another operation arm for guiding an intermediate portion of seat belt means 1 connected to the free end of operation arm 52 and retractor 17. Seat belt means 1 is not fixed to but passes through a seat belt guide 56 mounted at the free end of operation arm 53 operated by power means 55. Operation arm 53 is shown in FIG. 15 as guiding two seat belt means for the rear seats. Operation arm 53 which may be done without serves the purpose of facilitating passengers getting in and off the vehicle.

Figure 17B:
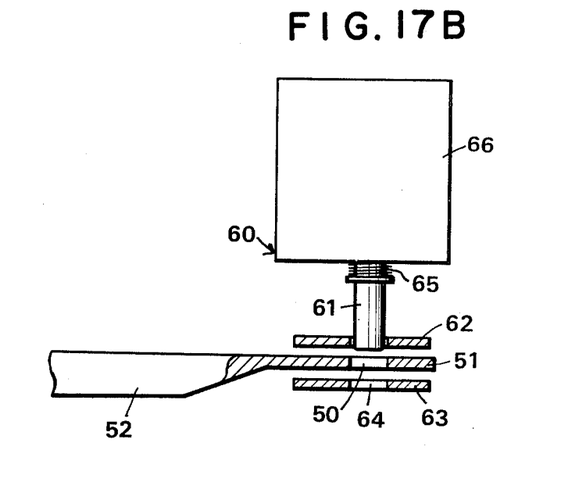

FIGS. 17A and 17B show essential portions of lock means 60, FIG. 17A showing operation arm 52 being locked and FIG. 17B showing operation arm 52 being unlocked immediately before or after being locked. 66 is a solenoid connected to an electric circuit as subsequently to be described. When energized, solenoid 66 overcomes the biasing force of a spring 65 and prevents pin 61 from being moved forwardly by the biasing force of spring 65 and unlocks operation arm 52 as shown in FIG. 17B. When de-energized, solenoid 66 permits pin 61 to be moved forwardly by the biasing force of spring 65 as shown in FIG. 17A, thereby locking operation arm 52. Operation arm 52 is locked and unlocked as pin 61 is received in an opening 50 formed in anchor plate 51 and an opening 64 formed in fixed plate 63 and removed therefrom.

Figure 18:
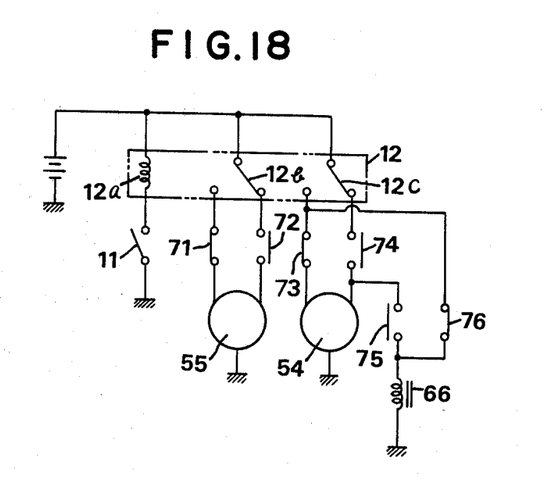
FIG. 18 shows another electric circuit used for operating the device according to this invention.

FIG. 18 shows an example of an electric circuit in which a motor is used as drive means 55 for operation arm 53 and a solenoid is used as lock means actuating means. Motor 55 has two operation circuits therefor, one of such operation circuits comprising a limit switch 72 adapted to open when operation arm 53 is brought to a substantially horizontal position and the other operation circuit comprising a limit switch 71 adapted to open when operation arm 53 is brought to a substantially vertical position. These two operation circuits for motor 55 are connected to a power source through a contact 12b of relay 12.

Contact 12b is adapted to be switched between the two operation circuits by the electromagnetic force of relay coil 12a connected through door switch 11 to power source. Door switch 11 may be a microswitch adapted to close when door 40 is opened and open when door 40 is closed, or a contact provided in door lock means.

Motor 54 for operating operation arm 52 also has two operation circuits thereof, one of such operation circuits comprising a limit switch 74 adapted to open when operation arm 52 is substantially in a horizontal position and the other operation circuit comprising a limit switch 73 adapted to open when operation arm 53 is substantially in a vertical position. These two operation circuits for motor 54 are connected to the power source through a contact 12c of relay 12.

Figure 19:
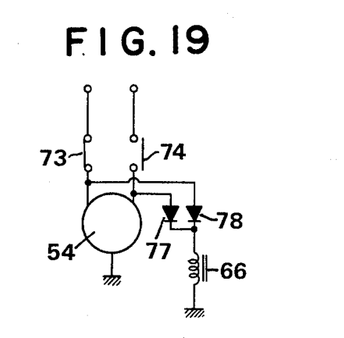
FIG. 19 is a modification of the circuit diagram of FIG. 18.

Like contact 12b, contact 12c is adapted to be switched between the two operation circuits by the electromagnetic force of relay coil 12a. Solenoid 66 is connected in parallel with the two operation circuits for motor 54 through limit switches 75 and 76. Diodes 77 and 78 may be used as shown in FIG. 19 in place of limit switches 75 and 76.

Operation of the fifth embodiment will now be described. If the door lock means is unlocked and door 40 is opened, door switch 11 is closed and the coil 12a of relay 12 is excited. This causes contact 12b to be switched into engagement with the operation circuit for motor 55 comprising limit switch 71 and contact 12c to be switched into engagement with the operation circuit for motor 54 connected to limit switch 76, so that motor 55 is operated through this operation circuit to bring operation arm 53 from its horizontal position toward its vertical position and solenoid 66 is energized through limit switch 76 so as to attract pin 61 as shown in FIG. 17B to thereby releasing anchor plate 51 from locking engagement with fixed plates 62 and 63. This permits the operation circuit having limit switch 73 to operate motor 54 so as to bring operation arm 52 from its horizontal position toward its vertical position.

Operation arms 52 and 53 cause seat belt means 1 to be paid out of retractor 17 as they move toward their vertical positions. When they reach their respective vertical positions, limit switches 71, 73 and 76 are opened so as to interrupt rotation of motors 55 and 54 and de-energize solenoid 66. At this time, seat belt means 1 is in a position shown in FIG. 15 so that a passenger can get in or off the vehicle without any let or hindrance.

If passenger is seated on seat 19 and door 40 is closed or the door lock means is locked, door switch 11 will be opened and coil 12a is rendered inoperative, so that contacts 12b and 12c are brought into engagement with the other operation circuits for motors 55 and 54. Thus, motors 55 and 54 are operated and solenoid 66 is energized through closed limit switches 72, 74 and 75 respectively, thereby causing operation arms 53 and 52 to move from their vertical positions toward their horizontal positions. At the same time, pin 61 is attracted to solenoid 66 again.

As operation arms 53 and 52 move in pivotal motion in this way, a length of seat belt means 1 which has become loose and redundant moves through opening 46 to be wound on retractor 17 by its resilience after moving between rollers 43. When operation arms 53 and 52 have reached their substantially horizontal positions, limit switches 72, 74 and 76 are opened so as to interrupt rotation of motors 55 and 54 and de-energize solenoid 66.

At the same time, pin 61 is inserted by the biasing force of spring 65 into opening 50 formed at the front end of anchor plate 51 and opening 64 formed in fixed plate 63. In this way, the seat belt means 1 secured to anchor plate 51 is firmly secured to vehicle body reinforcing member 42. Seat belt means 1 in this position is applied to the body of passenger and restrains him from being thrown off his seat when the motor vehicle is involved in a collision, so that passenger is prevented from being caused to suffer injury by the force of impact of collision.

If door 40 is opened when the passenger is going to get off the motor vehicle, operation arm 52 will be released from engagement with lock means 60 and move toward its vertical position from its horizontal position as does operation arm 53, so that seat belt means 1 is paid out from retractor 17 into a position shown in FIG. 15. Thus, the passenger is automatically released from engagement with seat belt means 1 to be free to get off the vehicle. Closing door 40 again causes seat belt means 1 to be wound on retractor 17 as described previously.

From the foregoing description, it will be appreciated that this embodiment of the automatic seat belt applying device according to this invention can be incorporated in any seat of a motor vehicle and permits seat belt means to be automatically applied to the body of an occupant of the seat in association with opening and closing of the door. The device according to this invention offers an advantage in that it eliminates the trouble of manually applying and fastening the seat belt means. Since the device is effective to make all the occupants of seats of a motor vehicle wear seat belts willy-nilly, it provides positive means for safeguarding the occupants of the motor vehicle against possible danger to which they might be exposed at the time of collision. The seat belt means is guided by operation arms so that it may not interfere with passengers getting in and out of the vehicle.

What is claimed is:

1. An automatic seat belt applying device for a vehicle comprising: seat belt means adapted to confine an occupant of a seat to a back rest thereof; a spring-loaded retractor secured to a lower inboard portion of a vehicle body; at least one supporter mounted on the outer marginal portion of a door which is hingedly supported at its inner marginal portion by said vehicle body; said seat belt means being connected at one end thereof to said retractor to be wound thereon by the resilience of said spring and rotatably at another end thereof to said supporter; and guide means connected to a portion of said vehicle body inboard of and separated from the door for loosely supporting an intermediate portion of said seat belt means, said guide means being adapted to move away and toward said seat in response to opening and closing of said door.

2. The automatic seat belt applying device as defined in claim 1, wherein at least one said supporter comprises a free end bar secured to said outer marginal portion located on the higher portion of the door above the window, said seat belt means being rotatably connected to said bar; the portion of said vehicle body, adjacent the outer marginal portion of said door when closed, having an opening adapted to accommodate the free end of said bar when said door is closed.

3. The automatic seat belt applying device as defined in claim 1, wherein said guide means comprises: an arm pivotably mounted on said vehicle body so as to pivot forward and backward; a bracket means universally jointed to the free end of said arm, said seat belt means being backed by said bracket means; and power means for pushing forward and pulling backward said arm in response to opening and closing of said door.

4. The automatic seat belt applying device as defined in claim 3, wherein said power means comprises: an electric motor; an electric circuit for energizing said motor wherein said motor revolves in one direction when said door is open and in the opposite direction when said door is closed; and rod means connected to said motor and said arm for transforming said motor's revolution to reciprocal motion.

5. An automatic seat belt device for a vehicle comprising: seat belt means adapted to confine an occupant of a seat to a back rest thereof; a spring-loaded retractor secured to a lower inboard portion of a vehicle body; at least one supporter mounted on the outer marginal portion of a door which is hingedly supported at its inner marginal portion by said vehicle body; said seat belt means being connected at one end thereof to said retractor to be wound thereon by the resilience of said spring and rotatably at another end thereof to said supporter; and guide means connected to an inboard portion of said vehicle body for loosely supporting an intermediate portion of said seat belt means, said guide means being adapted to move away and toward said seat in response to opening and closing of said door, and comprising an arm pivotably mounted on said vehicle body so as to pivot forward and backward; a bracket means universally jointed to the free end of said arm, said seat belt means being backed by said bracket means; and power means for pushing forward and pulling backward said arm in response to opening and closing of said door, said power means comprising an electric motor, an electric circuit for energizing said motor wherein said motor revolves in one direction when said door is open and in the opposite direction when said door is closed; and rod means connected to said motor and said arm for transforming said motor's revolution to reciprocal motion, and said electric circuit comprising an electric source; a relay having a coil and a relay switch, both being connected to said source in parallel; a first limit switch adapted to open when said arm is at the farthest position to said seat; a second limit switch adapted to open when said arm is at the nearest position to said seat, said first and second limit switches being connected to said relay and said motor in parallel, said motor being adapted to revolve in one direction when the circuit is closed by said first limit switch, and in the opposite direction when the circuit is closed by said second limit switch; and a door switch connected to said coil and adapted to close when said door is open and to open when said door is closed, said coil being energized and bringing said relay switch into engagement with said first switch when said door switch is closed, said coil being otherwise de-energized.

6. A safety belt assembly for use in a motor vehicle having a seat and a door hinged to a vehicle frame comprising: a seat belt having a generally Y-shaped configuration with a common strap anchored at one end thereof to an inboard structural portion of the vehicle frame, a shoulder strap and a transverse strap secured to the rearward free edge portion of said door at two vertically spaced points thereon and to said common strap at a second end thereof, a portion of the safety belt overlying at least a portion of said seat in any open or closed position of the door; variable length means secured at one end to a second inboard portion of the vehicle frame and attached at its other end to an intermediate portion of said common strap for displacing such common strap away from said seat in response to the opening of said door and toward said seat in response to the closing of said door, and means for controlling said last mentioned means responsive to the opening and closing of the door.

7. A safety belt assembly for use in a motor vehicle having a seat and a door hinged to a vehicle frame comprising:
 a seat belt having a generally Y-shaped configuration with a common strap anchored at one end thereof to an inboard structural portion of the vehicle frame,
 a shoulder strap and a transverse strap secured to the rearward free edge portion of said door at two vertically spaced points thereon and to said common strap at a second end thereof,
 a portion of the safety belt overlying at least a portion of said seat in any open or closed position of the door;
 means secured at one end to a second inboard portion of the vehicle frame and attached at its other end to an intermediate portion of said common strap for displacing such common strap away from said seat in response to the opening of said door and toward said seat in response to the closing of said said door, and
 means for controlling said last-mentioned means responsive to the opening and closing of the door.

* * * * *